United States Patent
Speck et al.

(10) Patent No.: US 12,254,622 B2
(45) Date of Patent: Mar. 18, 2025

(54) COMPUTING EMISSION RATE FROM GAS DENSITY IMAGES

(71) Applicant: Schlumberger Technology Corporation, Sugar Land, TX (US)

(72) Inventors: Andrew J. Speck, Milton, MA (US); Manasi Doshi, Cambridge, MA (US); Lukasz Zielinski, Arlington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/480,279

(22) Filed: Oct. 3, 2023

(65) Prior Publication Data
US 2024/0420311 A1    Dec. 19, 2024

Related U.S. Application Data

(60) Provisional application No. 63/508,669, filed on Jun. 16, 2023.

(51) Int. Cl.
*G06T 7/00* (2017.01)
*G01M 3/16* (2006.01)
(Continued)

(52) U.S. Cl.
CPC ............ *G06T 7/001* (2013.01); *G01M 3/16* (2013.01); *G06T 7/62* (2017.01);
(Continued)

(58) Field of Classification Search
CPC . G06T 7/001; G06T 7/62; G06T 2207/20221; G06T 2207/30232; G01M 3/16; H04N 23/695
See application file for complete search history.

(56) References Cited

U.S. PATENT DOCUMENTS 11,525,764 B2 * 12/2022 Bryning .............. G01N 15/0255
11,630,022 B2     4/2023 Hedberg
(Continued)

FOREIGN PATENT DOCUMENTS

CN    109195132 A    1/2019
CN    109614526 A    4/2019
(Continued)

OTHER PUBLICATIONS

Titchener et al. "Single photon Lidar gas imagers for practical and widespread continuous methane monitoring." Applied Energy 306 (2022): 118086 (11 pages).
(Continued)

*Primary Examiner* — Pinalben Patel
(74) *Attorney, Agent, or Firm* — Michael L. Flynn (57) ABSTRACT

Systems and methods are described for calculating an emission rate of a fugitive gas based on a gas density image of the fugitive gas. In an example, a computing device receives a gas density image of a fugitive gas from a camera. The computing device determines how to optimize the fugitive gas in the camera's field of view and instructions the camera to adjust its bearing and zoom accordingly. The camera captures one or more additional images of the fugitive gas, and the computing device stitches the images together where appropriate. The computing device then calculates the emission rate by delineating the fugitive gas in the image and determining a flux of the gas using one of various calculation methods.

17 Claims, 5 Drawing Sheets

(51) Int. Cl.
*G06T 7/62* (2017.01)
*H04N 23/695* (2023.01)

(52) U.S. Cl.
CPC ............... *G06T 2207/20221* (2013.01); *G06T 2207/30232* (2013.01); *H04N 23/695* (2023.01)

(56) References Cited

U.S. PATENT DOCUMENTS

| | | | |
|---|---|---|---|
| 2015/0103178 A1 | 4/2015 | Itoh | |
| 2015/0213697 A1* | 7/2015 | Knox | G06T 7/40 382/103 |
| 2015/0369730 A1* | 12/2015 | Schmidt | G01J 3/10 250/208.1 |
| 2016/0146696 A1 | 5/2016 | Steele | |
| 2017/0024642 A1 | 1/2017 | Xiong | |
| 2017/0364818 A1 | 12/2017 | Wu | |
| 2018/0039885 A1 | 2/2018 | Albrecht | |
| 2018/0292286 A1 | 10/2018 | Dittberner | |
| 2018/0365522 A1 | 12/2018 | Jiang | |
| 2019/0196892 A1 | 6/2019 | Matei | |
| 2019/0285504 A1 | 9/2019 | Muralidhar | |
| 2019/0285600 A1 | 9/2019 | Klein | |
| 2019/0302013 A1* | 10/2019 | Wang | G01M 3/38 |
| 2020/0011789 A1* | 1/2020 | Sandsten | G01N 21/3504 |
| 2020/0176088 A1 | 6/2020 | Kanamarlapudi | |
| 2020/0182779 A1 | 6/2020 | Kasten | |
| 2020/0226426 A1 | 7/2020 | Jarquin Arroyo | |
| 2020/0393434 A1 | 12/2020 | Li | |
| 2020/0398959 A1 | 12/2020 | Pomerantz | |
| 2021/0140934 A1 | 5/2021 | Smith | |
| 2021/0156793 A1 | 5/2021 | Leen | |
| 2021/0255157 A1 | 8/2021 | Rashid | |
| 2022/0244127 A1 | 8/2022 | Aubrey | |
| 2022/0327708 A1* | 10/2022 | Satish | G06T 7/62 |
| 2023/0111401 A1 | 4/2023 | Machover | |
| 2023/0175914 A1 | 6/2023 | Diven | |
| 2023/0177726 A1 | 6/2023 | Spears | |
| 2023/0194483 A1* | 6/2023 | Some | G01N 30/32 73/61.55 |
| 2023/0222271 A1 | 7/2023 | Spackova | |
| 2023/0324430 A1 | 10/2023 | Reed | |
| 2023/0326201 A1 | 10/2023 | Rashid | |
| 2024/0067919 A1* | 2/2024 | Kamino | C12M 47/02 |
| 2024/0200991 A1 | 6/2024 | Salman | |

FOREIGN PATENT DOCUMENTS

| | | |
|---|---|---|
| CN | 113887044 A | 1/2022 |
| CN | 114329245 A | 4/2022 |
| CN | 114416692 A | 4/2022 |
| CN | 115018327 A | 9/2022 |
| CN | 115187767 A | 10/2022 |
| EP | 0943085 B1 | 3/2004 |
| JP | H06294500 A | 10/1994 |
| JP | H07083786 A | 3/1995 |
| JP | H07140031 A | 6/1995 |
| JP | H07190879 A | 7/1995 |
| JP | H07198523 A | 8/1995 |
| JP | 2996349 B2 | 12/1999 |
| KR | 101473956 B1 | 12/2014 |
| KR | 102015003470 A | 1/2015 |
| KR | 1020160123467 A | 10/2016 |
| KR | 20180041828 A | 4/2018 |
| KR | 1020190058230 A | 5/2019 |
| WO | 2019213280 A1 | 11/2019 |
| WO | 2020018867 A1 | 1/2020 |
| WO | 2020206008 A1 | 10/2020 |
| WO | 2020263693 A1 | 12/2020 |
| WO | 2021067844 A1 | 4/2021 |
| WO | 2021156864 A1 | 8/2021 |
| WO | 2022023226 A1 | 2/2022 |
| WO | 2022051572 A1 | 3/2022 |
| WO | 2022056152 A1 | 3/2022 |
| WO | 2023108041 A1 | 6/2023 |
| WO | 2023133345 A1 | 7/2023 |
| WO | 2024030523 A1 | 2/2024 |
| WO | 2024030525 A1 | 2/2024 |
| WO | 2024054640 A1 | 3/2024 |
| WO | 2024064113 A1 | 3/2024 |
| WO | 2024155857 A1 | 7/2024 |

OTHER PUBLICATIONS

Saunois, M., et al. (2020), The Global Methane Budget 2000-2017, Earth Syst. Sci. Data, 12, 1561-1623.
Pomerantz A.E. et al., 2022. Present global warming: a justifiable and stable metric for evaluating short-lived climate pollutants. Environmental Research Letters, 17(11), p. 114052. (6 pages).
Cusworth, D.H. et al., 2021. Intermittency of large methane emitters in the Permian Basin. Environmental Science Technology Letters, 8(7), pp. 567-573.
Chakrabarti et al., Sep. 2022. Rapid Detection of Super-Emitters Utilizing an IoT-Enabled Continuous Methane Emissions Monitoring System. In SPE Annual Technical Conference and Exhibition. OnePetro. (6 pages).
Chakrabarti et al., Oct. 2022. Rapid Detection of Methane Super-Emitters Through Advanced Interpretation. In ADIPEC. OnePetro (6 pages).
Potyrailo, R.A. et al., 2020. Extraordinary performance of semiconducting metal oxide gas sensors using dielectric excitation. Nature Electronics, 3(5), pp. 280-289.
Zimmerle, D. Metec Controlled Test Protocol: Continuous Monitoring Emission Detection and Quantification, Energy Institute, Colorado State University. https://energy.colostate.edu/wp-content/uploads/sites/28/2021/03/Continuous-Monitoring-Protocol-R1.0.pdf (31 pages).
Take control of your emissions management programme, downloaded on Dec. 15, 2023 from link https://sensorup.com/methane-emissions-management/ (12 pages).
BlueSky resources makes sense out of sensors, downloaded on Dec. 15, 2023 from linke https://blueskyresources.com/solutions/ (3 pages).
International Search Report and Written Opinion issued in PCT Application PCT/US2023/010475, dated May 2, 2023 (11 pages).
S. R. Hanna, G. A. Briggs, R. P. Hosker, 1982, Handbook on Atmospheric Diffusion, DOE/TIC-11223 (7 pages).
International Search Report and Written Opinion issued in PCT Application PCT/US2023/032307, dated Dec. 26, 2023 (10 pages).
International Search Report and Written Opinion issued in PCT Application PCT/US2023/029361, dated Nov. 14, 2023 (11 pages).
Yu et al., "Methane leakage source location based on a near-infrared off-axis integrated cavity output spectroscopic ppbv-level sensor and an optimized inverse model", Infrared Physics & Technology, 2022, vol. 121, pp. 1-9 (Jan. 6, 2022).
Weidmann et al., "Locating and Quantifying Methane Emissions by Inverse Analysis of Path-Integrated Concentration Data Using a Markov-Chain Monte Carlo Approach", ACS Earth and Space Chemistry, 2022, vol. 6, Issue 9, pp. 2190-2198 (Jul. 8, 2022).
Ye et al., "Leakage source location based on Gaussain plume diffusion model using a near-infrared sensor", Infrared Physics & Technology, 2020, vol. 109, pp. 1-5 (Jun. 19, 2020).
International Search Report and Written Opinion issued in PCT Application PCT/US2023/033106, dated Jan. 23, 2024 (7 pages).
Search Report issued in Norwegian Patent Application No. 20230720 on Jan. 23, 2024; 10 pages.
Majumder et al., "Development and Evaluation of Ensemble Learning-based Environmental Methane Detection and Intensity Prediction Models", Dec. 17, 2023, pp. 1-16 (Year: 2023).
Andrews et al., "Quantitative Mapping of Methane Emissions in Oil & Gas Facilities", Oct. 16-18, 2023, Society of Petroleum engineers, SPE-214909-MS, pp. 1-10 (Year: 2023).
Imbiriba et al., "Augmented physics-based machine learning for navigation and tracking", 2023, IEEE Transactions on Aerospace and electronic Systems, pp. 1-13 (Year: 2023).

(56) References Cited

OTHER PUBLICATIONS

Chakrabarti et al., "Rapid Detection of Methane Super-Emitters Through Advanced Interpretation", Oct. 31-Nov. 3, 2022, Society of Petroleum Engineers, SPE-210970-MS, pp. 1-6 (Year: 2022).

International Search Report and Written Opinion issued in PCT Application PCT/US2023/083724, dated Apr. 30, 2024 (9 pages).

Combined Search and Exam Report issued in United Kingdom patent Application No. GB2409015.1 dated Oct. 8, 2024, 5 pages.

International Search Report and Written Opinion issued in the PCT Application No. PCT/US2024/033102 dated Sep. 24, 2024, 10 pages.

Notice of Allowance issued in U.S. Appl. No. 18/537,978 dated Aug. 19, 2024, 10 pages.

Yu, L. et al., "Methane leakage source location based on a near-infrared off-axis integrated cavity output spectroscopic ppbv-level sensor and an optimized inverse model", Infrared Physics Technology, 2022, vol. 121, pp. 1-9.

Ye, W. et al., "Leakage source location based on Gaussain plume diffusion model using a near-infrared sensor", Infrared Physics Technology, 2020, vol. 109, pp. 1-5.

"AERMOD" downloaded from Wikipedia on Jul. 31, 2024 from [https://en.wikipedia.org/wiki/AERMOD], Last Edited Mar. 4, 2022, 2 pages.

International Search Report and Written Opinion issued in the PCT Application No. PCT/US2023/029361 dated Nov. 14, 2023, 11 pages.

International Search Report and Written Opinion issued in the PCT Application No. PCT/US2024/012087 dated May 23, 2024, 11 pages.

International Preliminary Report on Patentability issued in the PCT Application No. PCT/US2023/010475 dated Jul. 25, 2024, 8 pages.

International Search Report and Written Opinion issued in PCT Application PCT/US2023/029363, dated Nov. 21, 2023 (10 pages).

Extended Search Report issued in European Patent Application No. 24182656.9 dated Nov. 14, 2024, 6 pages.

\* cited by examiner

COMPUTING EMISSION RATE FROM GAS DENSITY IMAGES

CROSS-REFERENCE TO RELATED APPLICATIONS

The present application claims priority to U.S. Provisional Application 63/508,669, filed Jun. 16, 2023, the entirety of which is incorporated by reference.

BACKGROUND

Calculating the emission rate of fugitive gases is an important part of detecting and determining the extent of leaks resulting from mining activity. These fugitive gas emissions contribute to greenhouse gas emissions that are harmful to the environment. Many fugitive emissions are the result of loss of well integrity through poorly sealed well casings due to geochemically unstable cement. This allows gas to escape through the well itself (known as surface casing vent flow) or via lateral migration along adjacent geological formations (known as gas migration).

Gas imagers scan a finite field of view ("FOV") at a time. Some solutions include scanning pattern continuously and cyclically iterating through these predefined frames, acquiring images, and marking the images as positive if it sees an identifiable plume within the frame or negative if it does not. Each acquisition acts as a standalone observation. In solutions with recentering and zooming capabilities, upon plume detection, the imager may recenter on an estimated plume origin and acquire an additional frame at a predefined zoom (same as or different from the original zoom level). Even with optimally selected frames, such a scan cycle is prone to false positives from noise as well as large plumes spread across multiple frames, restricts attribution to sources within these predetermined frames, increases the likelihood of attributing an emission to an incorrect source, reduces the accuracy with which the duration of a leak can be calculated, limits leak rate quantification accuracy, and is susceptible to false negatives if the imager sees a portion of the plume but does not see an identifiable plume origin.

With rising concerns around gas emissions (especially greenhouses gases such as methane and carbon dioxide), it is crucial to accurately detect gas emissions along with their source, duration, and emission rate. As a result, a need exists for a gas imaging system that can adapt to real-time detections and changes.

SUMMARY

Examples described herein include systems and methods for an automatic and adaptive scanning method to efficiently scan for gas plumes originating from a facility using an imaging or LiDAR based gas monitoring system. In an example, a gas monitoring system can be coupled to a laser absorption spectroscopy with LiDAR. The gas monitoring system can have the ability to connect to an anemometer, change zoom level, and control the heading and tilt of a gas imaging camera (referred to interchangeably with "imager" and "camera").

In an example, a computing device in the gas monitoring system receives a gas density image of a fugitive gas from a gas imaging camera. The computing device determines how to optimize the fugitive gas in the camera's field of view ("FOV") and instructs the camera to dynamically adjust its bearing and zoom accordingly. In one example, if the fugitive gas is present in less than a threshold percentage of the image, then the computing device can send instructions to the camera to adjust its zoom and bearing (e.g., pan and tilt), to center the fugitive gas and increase its presence in the camera's FOV. If the gas plume is too large, then the computing device can instruct the camera to zoom out and adjust its bearing to decrease the gas plume's presence. In one example, the computing device can continue to adjust the camera until the camera captures an image of the fugitive gas that satisfies preset parameters. In an example where a single image cannot capture the gas plume based on the parameters (i.e., the gas plume extends horizontally beyond the FOV of the camera), then the computing device can instruct the camera to capture multiple images of the gas plume and then stitch the images together.

In another example, when a gas emission is detected in an image, the computing device can determine the location with the highest gas concentration in the image. If the highest concentration point is close to the center of the field of view (e.g., within 15% of the central area of the frame), the frame is assumed to contain the true leak source. The computing device marks the image frame as positive for gas emission, and the gas monitoring system can continue to scan the nearby area for gas emissions. If the highest concentration is not within a threshold area of the central area of the image, then the gas monitoring system can adjust the imager to capture a second image that is centered around the point with the highest concentration in the first image. This recentering process continues until the highest concentration point is within an expected area around the center of the image.

When the appropriate final image(s) has been obtained, the computing device can calculate the emission rate. The final image could be the second image, third image or nth image. In one example, the computing device can delineate the fugitive gas in the image and determine the gas's volume by converting pixels to units of length. This conversion can be done, for example, using the camera's angle and a measured length from the camera to the gas. The volume, along with other relevant data like wind measurements, can be inputted into an equation that outputs a flux measurement. In another example, the computing device can calculate the emission rate by dividing the plume into multiple cross-sectional planes, calculating the flux for each plane, and then averaging the fluxes together.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for calculating an emission rate of a fugitive gas based on a gas density image of the fugitive gas. In an example, a computing device receives a gas density image of a fugitive gas from a camera. The computing device determines how to optimize the fugitive gas in the camera's field of view and instructions the camera to adjust its bearing and zoom accordingly. The camera captures one or more additional images of the fugitive gas, and the computing device stitches the images together where appropriate. The computing device then calculates the emission rate by delineating the fugitive gas in the image and determining a flux of the gas using one of various calculation methods.

Figure 1:
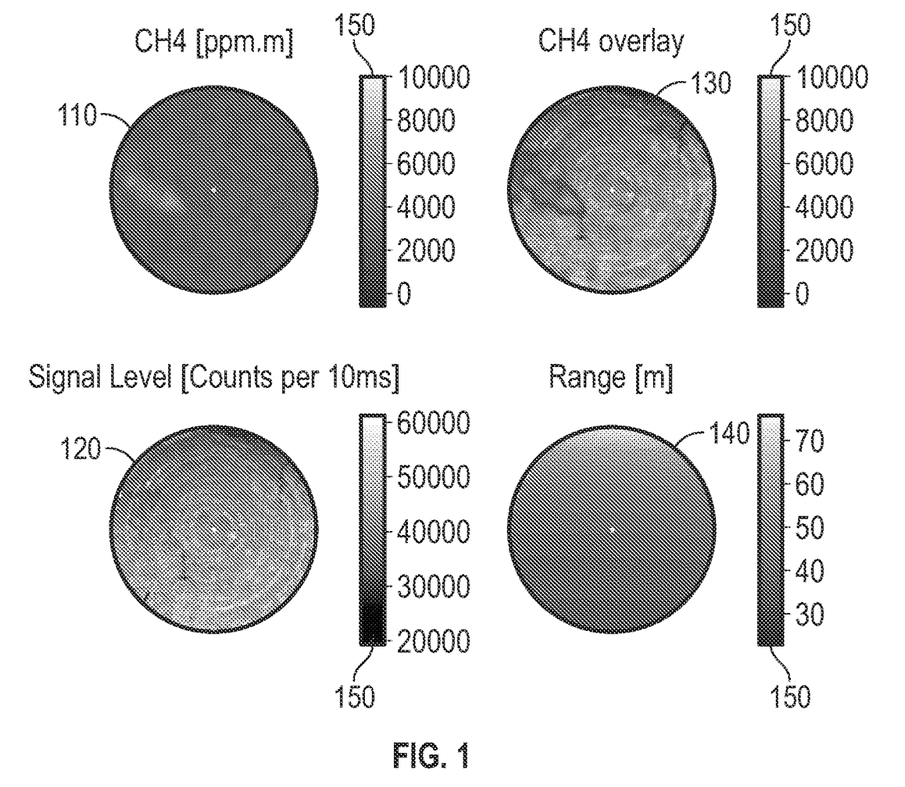
FIG. 1 is an illustration of example gas density images.

FIG. 1 is an illustration of example gas density images, including a part-per-million ("ppm") times meters ("ppm-m") image 110, a signal level image 120, a LiDAR image 140, and an overlay image 130. Each of the density images 110, 120, 130, 140 include a legend 150 that helps aid in interpretating the image data. The ppm-m image 110 shows the ppm of CH4 particles multiplied by the distance from the camera to the particles. The signal level image 120 shows the detected photon count. The LiDAR image shows the measured distance from the camera location to the reflecting surface. The overlay image 130 is an overlay of the ppm-m image 110 and the signal level image 120.

The methods for computing emission rates rely on a density image like the overlay image 130. Other density image types, like the ppm-m image 110, signal level image 120, and LiDAR image 140, are helpful but not necessary. These other density image types can be substituted by other means as appropriate.

Figure 2:
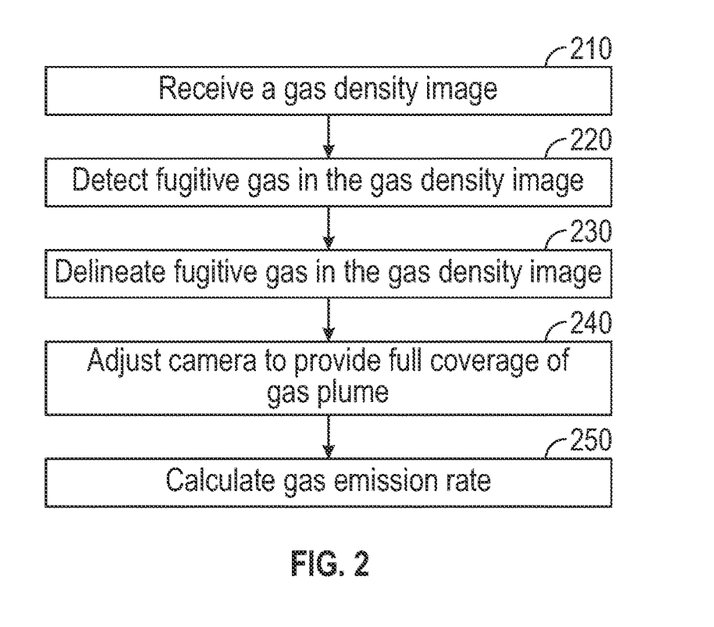
FIG. 2 is a flowchart of an example method for computing an emission rate from a gas density image.

FIG. 2 is a flowchart of an example method for computing an emission rate from a gas density image. At stage 210, gas monitoring system can receive a gas density image. The gas density image can be a data file of an image taken with a camera. The image can be taken with any gas imaging camera that can generate a gas density image rather than just returning a single point measurement. For example, the gas imaging camera can be an OGI camera, an open-path laser spectroscopic camera, or a visual smoke camera.

At stage 220, the gas monitoring system can detect fugitive gas in the image. For example, the computing device can analyze the image for above-background levels of a gas of interest (e.g., methane) present in the atmosphere in the line of view of the camera. The computing device can do this by comparing various data points. For example, the computing device can compare the measured density in the image to expected readings that are based on measured background methane levels. The computing device can also account for expected noise levels and any offsets or other biases present in the measurement system.

Background methane concentration levels vary from site to site. The global average is about 1.9 ppm, but in regions with more agricultural or industrial activity (e.g., in areas with cattle grazing or significant oil and gas production), the background levels may be higher. In one example, background methane concentration levels can be measured on site at least once prior to capturing the first gas density image. The methane concentration levels can be measured periodically after the initial measurement as well to ensure the most accurate value. Optimally, the background measurement is conducted on the upwind side of the site so as to eliminate any residuals leaks from the site itself contributing to the background measurement. This approach quantifies any inflowing methane from nearby facilities if present.

The expected density in ppm-m along the given beam path can then be computed by multiplying the background concentration value by the path length. The path length can be obtained from the LiDAR measurement if present or built into the imager/camera. Alternatively, the path length can be measured separately for the particular camera bearing by any known means. Any excess density reading (i.e., the measured value at each image pixel minus the background contribution) is then compared to the noise level. As used herein, the term "noise level" is just a single number that aims to represent an often complex instrumental response. A more complete characterization of noise requires providing the full distribution acquired over a representative period of time. Also, in instances where the distribution is not centered at zero, this approach ensures that any systematic offsets are captured correctly. In case of Gaussian noise, the distribution is Gaussian, and the noise level can be given by some multiple of the width of the distribution. If the noise is not Gaussian, the tails of the distribution may be very broad and a simple description in terms of distribution may not be sufficient. In such instances, some other distribution mode, such as the maximum, can be used in order to avoid false positives.

For a large leak, such as when the measured signal is much stronger than the noise or background, the identification is straightforward and the risk of false positives low. However, for the most robust identification of weak leaks, a full noise distribution can be acquired at the given site. A full noise distribution can also be acquired for each particular camera bearing and for different atmospheric conditions, as the noise distribution for a laser scanner may depend on the type of background surface, its condition (e.g., if it is wet, dusty, or covered in snow), and other environmental conditions. In some cases, the noise distribution can be obtained from a subsection of the image on the upwind side of the identified plume source.

In an example, a plume detection event (i.e., high confidence of the presence of excess methane or other gas above background levels) can be defined as sufficient pixels in the image having sufficient excess reading above noise. Both thresholds can be tuned based on the strength of preference for avoiding false positives or false negatives.

In one example, a criterion for positive detection can include a comparison of histograms. For example, a histogram can be created for noise measurements and another for methane release measurements for the same location. The two histograms can include bins (i.e., data groupings of equal widths) on the x-axis based on density points in the image. The y-axis can include corresponding measured photon counts from a photon count image. In one example, a plume can be detected by performing a bin-by-bin comparison of the two histograms and putting a requirement on magnitude of the positive lobe relative to the peak of the entire distribution. In another example, the means of each distribution can be compared. If a measured noise distribution is not available, a synthetic noise model can be used instead. A synthetic noise model can be created, for example, by laboratory testing and calibration of the particular imager unit.

At stage 230, the gas monitoring system can delineate the fugitive gas in the image. This can be done using one of various image peak detection methods. In image processing, a peak is a position on the image where all the surrounding pixels have a smaller value. One such method can start with the identification of the presumed emission source as the highest density point in the image. The gradient of concentration density in each direction is tested against the noise threshold. In one example, one or more levels of smoothing can first be applied first to the raw image.

At stage 240, the computing device can adjust the camera to provide full coverage of the gas plume. For example, the computing device can have control over the camera's acquisition parameters, such as the camera's bearing (e.g., pan and tilt) and zoom. The computing device can adjust the camera to maximize the portion of the image that includes the gas plume while ensuring that the image includes the entire gas plume.

There are two possible cases where camera adjustment is needed. In a first case, the plume is small so that it fills just a small fraction of the FOV. In a second case, the plume is large relative to the FOV, possibly even filling the image entirely or expanding beyond the FOV captured in the image. In the first case, the computing device can center the gas plume (or, alternatively, on an identified emission source) in the camera's FOV and increase the zoom level so that the plume occupies a significant portion of the vertical FOV, sufficient to have multiple measurement points above noise level while at the same time having a clear separation between the edge of plume and the boundary of the image. As an example, a reasonable range for the FOV can be 20-30%. If the ideal range is not attainable because of distance or thinness of the plume, then the computing device can apply the maximum zoom level of the camera. Repeated image acquisition may be required if the detection is marginal (i.e., the excess signal above noise is small) in order to improve the signal-to-noise ratio and thereby improve the accuracy of the emission rate computation.

The computing device can next adjust the camera's bearing to maximize coverage of the plume. The computing device can orient the camera so that the FOV is centered on the identified emission source in the vertical dimension. Because the plume will spread laterally in the direction of wind, the computing device can shift the camera's FOV toward the downwind side of the emission source. In an example, if the plume is well captured vertically but extends horizontally beyond the image boundary, the computing device can reorient the camera horizontally and capture a second image of the plume. The computing device can then stitch the images together to form a single image of the plume. The computing device can reorient the camera to take as many images as needed to capture the entirety of the plume. All the images can be stitched together into a single image of the plume.

In the second case where the plume is large relative to the FOV, the computing device can reduce the zoom level as much as possible. If the plume continues to exceed the FOV even at the lowest zoom, multiple images can be acquired at adjacent FOV's. Most importantly, the computing device can cause the camera to capture multiple images in the vertical direction by tilting the bearing of the camera up and down by the number of degrees in the current FOV. The computing device can then stitch the images together. The computing device can repeat this process, stitching additional images, until the full plume is captured in the stitched image. For reasons discussed at stage 250 below, it is critical that vertical direction of the plume have an accurate cross section and density measurement because these are key drivers in flux computations. The computing device can perform the same process in the lateral direction by panning the camera by a few degrees each way, first in the upwind direction, until the edge and origin of the plume are reached. The computing device can then adjust the camera in the downwind direction until the plume is no longer clearly visible above noise level. All the frames are then stitched together into a panorama and the full stitched image is processed for emission rate calculation. At stage 250, the computing device can calculate a gas emission rate based on the final image. The emission rate can be based on other factors as well, such as the measured signal count and local weather data. Local weather data can be obtained from any appropriate source, such as a local weather station.

In an example, the emission rate can be computed based on the mass conservation principle where the total rate of change of the amount of substance ("q") within a given volume is equal to the total rate of generation of q within the volume ("V") minus the total flux of q ("j"), out of the volume through the enclosing surface. Table 1 includes an example of a closed surface integral equation to can be used for the calculation.

TABLE 1

$$V = \frac{dq}{dt} + \oiint j \cdot ds$$

In the case of pollutant transport, the flux j at a given point in space is given by the product of the pollutant concentration with its travel velocity at that point. Assuming the pollutant is a small particle or molecule, such as methane, which behaves like a tracer molecule, the travel velocity sufficiently downwind from the release point is given by the wind speed and direction. Therefore, the wind measurement should ideally be as close to the emission source as possible. Given that the location of the weather station may be 10s or 100s of meters away from the plume, suitable averaging of the wind velocity can be applied to make sure the wind measured at the weather station is representative of the wind at the plume location. In one example, an averaging window of several minutes can be used. In another example, the acquisition time of the whole image can be used for the time to average over. A running window average of the wind vector can be used or, alternatively, a single mean wind speed and direction value over the whole period. The ideal case for the leak rate computation is steady moderate winds. Gusty shifting winds changing on the time scale of the image acquisition can introduce significant errors into the computation. A record quality metric can be assigned to the calculated emission rate based on atmospheric conditions.

Figure 3:
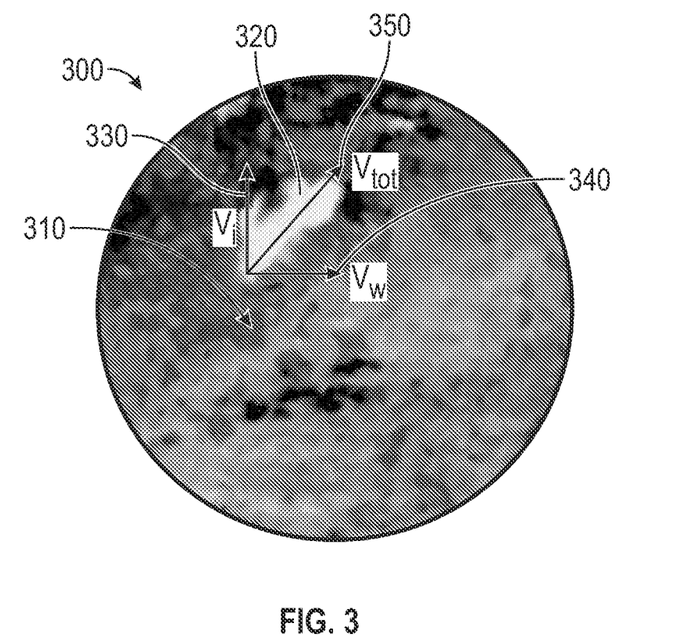
FIG. 3 is an illustration of an example density image where a gas plume has vertical and horizontal movement.

The pollutant transport velocity near the emission source may be systematically different from the wind speed due to the initial momentum of the release jet. Given that the detection quality is best nearest the release point, as the concentration is the highest in the vicinity of the leak, the initial momentum term can be considered. This can be important for large gas releases where gas gushes out in a particular direction that may be at some angle with respect to wind speed. FIG. 3 is an illustration of such an example density image 300 where a gas plume has additional vertical and horizontal movement. The release point 310, represented by a triangle, is where the gas 320 is released into the air. The $V_w$ arrow 340 represents the wind vector and the $V_i$ arrow 330 represents the initial jet (vertical) momentum vector of the gas. The total transport velocity of the gas, which is represented by the $V_{tot}$ arrow 350, can be calculated by adding the wind and initial jet vectors. The wind speed cannot be used alone to compute the flux in the plume shown in FIG. 3 because the plume does not simply follow the—mostly horizontal—wind. The actual transport velocity $V_{tot}$ is the sum of the wind $V_w$ and initial jet velocity $V_i$. For a clearly visible plume, it can be computed using basic trigonometry based on the known wind speed (assumed horizontal) and the angle that the plume makes with the horizontal.

Returning to stage 250 of FIG. 2, a mass conservation formula assumes integration around the surface enclosing the entire volume from which the substance is released. The image acquired, on the other hand, is two-dimensional, with the dimension along the laser beam being into-the-page and already pre-integrated (hence the unit ppm-m) which constrains the shape of the enclosing surface that must be used as being flat along the beam direction and camera bearing. While the remaining shape of the enclosing surface can be arbitrary, only the component orthogonal to the flux direction counts towards the emission rate computation, which is imposed by the dot product between the surface element dS and j. The flux can be computed through any such surface intersecting the plume. Because the plume will travel in the direction of the wind (and initial jet momentum), it is not necessary to complete the measurement around the entire enclosing surface as the pollutant will flow only downwind of the emission source. Conceptually, the simplest case is to choose a surface that is orthogonal to the plume travel direction as visible in the image; or take a vertical slice through the plume and apply the correction based on the plume total velocity angle with respect to the vertical. As the lateral dimension of the surface is fixed by the beam direction, the angle the camera bearing makes with the wind direction must be explicitly accounted for in the computation by multiplying by the cosine of the angle between the lateral wind direction and camera bearing.

Although in principle integration across any particular surface through the plume should yield the total flux and thus the emission rate, in practice, due to poor signal-to-noise ratio and statistical fluctuations due to wind turbulence, the computation can be improved by using multiple slices across the plume and determining an average to utilize all the data available in the image. This method is visually illustrated by the diagram 400 in FIG. 4. The diagram 400 includes the release point 410 and the outline of a gas plume 420. Cross-sections 430a, 430b, 430c, and 430d (referred to collectively as "cross-sections 430), represent cross-sectional cut planes of the gas plume 420. Although four cross sections 430 are illustrated, this is merely exemplary and not meant to be limiting in any way. For example, any number of cross sections 430 can be used as deemed appropriate, such as two or eight.

Figure 4:
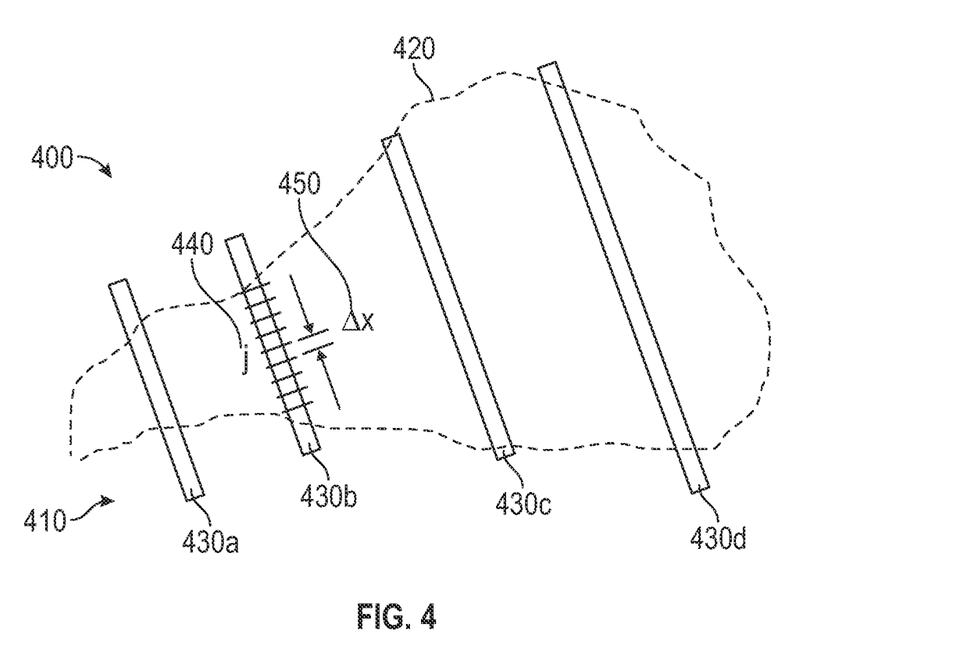
FIG. 4 is a visual illustration of an example method for determining flux for an identified gas plume.

The final flux ("F") of the plume can be calculated by averaging a determined flux through the cross-sections 430. The flux of each cross-section 430 can be calculated using an appropriate formula, such as the example formula in Table 2 below.

TABLE 2

$$f_i = \Delta x \sum_j c_{ij} g_j U$$

In the example equation above, $c_{ij}$ represents the concentration in the image pixel located at the ith cut plane (i.e., cross section 430) and jth location 440 along the plane; $\Delta x$ (illustrated by $\Delta x$ 450) represents the spacing between adjacent image pixels along the cut plane direction; $g_j$ is a weighting function across the plume 420, which could be uniform or could be based on the known physics of plume dispersion; and U is the plume travel velocity component orthogonal to the cut plane. In other words, U takes into account both the lateral and vertical alignment of camera bearing, wind direction, and initial jet momentum direction discussed previously herein. One choice for the $g_j$ may be a Gaussian centered at the highest concentration in the cut plane 430 or at the center of the cut plane 430. Its actual shape can be determined by the parameters defined in the Gaussian plume model of atmospheric dispersion, permitting the signal integration to extend below the visible plume into the noise level by applying the technique of optimal filtering for known signal shape. This can significantly improve the performance for low leak rates.

After calculating the flux $f_i$ of each cross-section 430, the final flux F value can then be computed as a mean of the fluxes $f_i$ through all the cut planes (cross sections 430). In one example, the final flux can be weighted based on some weighting factor $w_i$, which can be a function of the total amount of signal available in the given cut plane or the total signal-to-noise ratio within a given cut plane. Table 3 below includes an example formula for calculating the final flux F.

TABLE 3

$$F = \frac{1}{n}\sum_{i=1}^{n} f_i w_i$$

The last step necessary for flux computation involves estimating the $\Delta x$ (the spacing between adjacent image pixels). The actual image coordinates are FOV degrees that can be converted to pixels if the distance from the camera to the reflecting surface (i.e., the plume) is known. The distance can be determined using any available method, such as a LiDAR image or by other means based on the known camera location and bearing. Using this number in the computation is equivalent to assuming that the plume occurs at the end of the range and will yield the largest leak estimate. If an identical plume was placed closer to the camera, it would result in a larger plume image and thus a larger leak rate estimate. Therefore the minimum leak estimate can be computed by scaling the $\Delta x$ based on the closest that a leak can possibly be to the camera. A better estimate can be obtained with additional information about the locations of possible leak sources relative to the camera. Once the leak is identified on an image, the image can be overlayed on an RGB image or LiDAR or photon count image, as available. Based on the shape of the plume visible in the image and the estimate of the plume start location, the component closest to the plume start location can be tagged as the leak source, and the distance from the camera to that component can be used for scaling $\Delta x$ and calculating the final leak rate computation. If multiple potentially leaking components are all in line along the bearing of the camera, it may be impossible to distinguish which one the leak is issuing from.

In such an instance, multiple leak estimates can be provided, depending on the attributed source.

Figure 5:
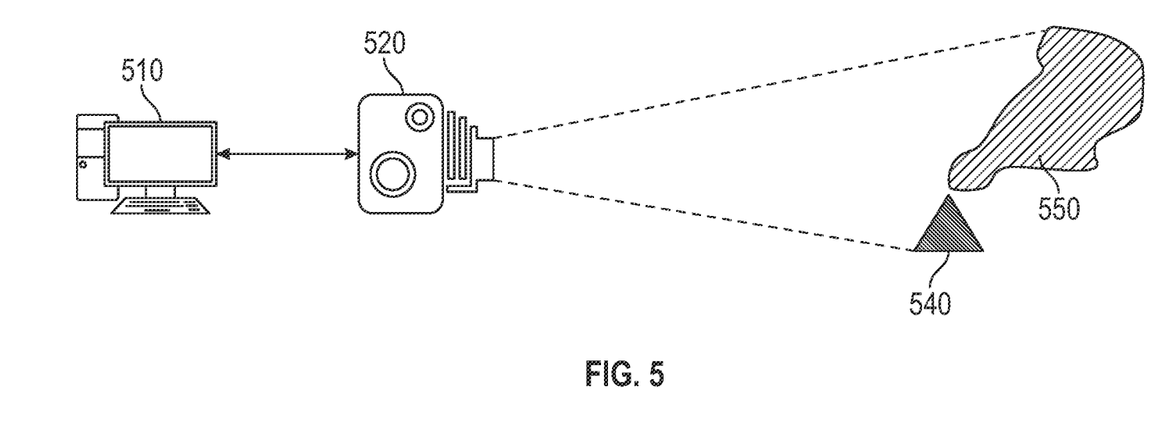
FIG. 5 is an example system for computing an emission rate of a gas plume.

FIG. 5 is an example system for computing an emission rate of a gas plume. A computing device 510 can communicate with a camera 520 for capturing images of a gas plume 550. The gas plume 550 can originate from a release point 540. The computing device 510 can one or more processor-based devices, such as a personal computer, tablet, a cell phone, or a server. The camera 520 can be any kind of gas imaging device for capturing gas density images of the gas plume 550. For example, the camera 520 can be a laser gas camera, a ("Forward Looking Infrared") FLIR camera, a LiDAR device, or some combination of these. The camera 520 can include mechanisms (not shown) for adjusting zoom and bearing. The computing device 510 can have control over these mechanisms so that the computing device 510 can adjust the zoom, bearing, and any other appropriate settings of the camera 520. The computing device 510 can communicate with the camera 520 using a wired or wireless connection, such as BLUETOOTH or WI-FI. The computing device 510 can also send instructions to the camera 520 for capturing images, and the computing device 510 can send such images to the computing device 510 for analysis.

Figure 6:
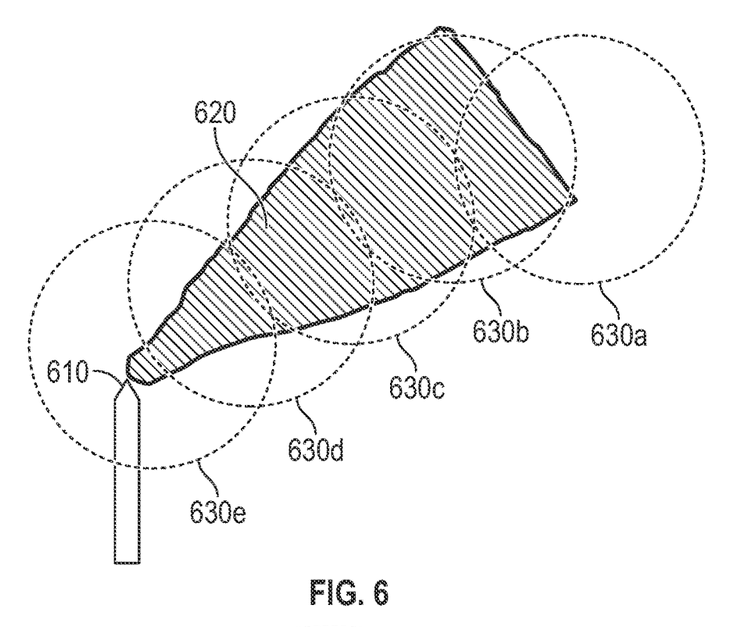
FIG. 6 is a diagram that illustrates a method for dynamically adjusting a camera to identify a gas emission source.

FIG. 6 is an illustration of a method for dynamically adjusting a camera to identify a gas emission source. For example, a gas monitoring system can scan an area for gas plumes and dynamically adjust the imager when an emission is detected to ensure that the image includes the emission source. For example, when an emission is detected in an image, the gas monitoring system can determine a location of the image with the highest gas concentration. If the highest concentration point is close to the center of the field of view (e.g., within a threshold percentage of the central area of the image), the image is assumed to contain the true leak source. The gas monitoring system can mark the image as containing the emission source and continue scanning the area. If the highest concentration is not within the threshold percentage, then the gas monitoring system can adjust the camera (e.g., change the zoom, pan, and tilt) so that the center of the camera's FOV is pointed at the highest concentration point from the first image. The gas monitoring system can capture a second image with the camera and repeat the process until the highest concentration point of gas emission is within the threshold percentage of the center of an image.

The method described above is illustrated in FIG. 6, which includes an emission release point 610 and a gas emission 620. The concentration of gas in the gas emission 620 is highest at the release point 610 and lessens as the distance from the release point 610 increases. Each of FOV circles 630a-e represent the FOV of a different image. In an example, the gas monitoring system first captures a first image where the area captured is represented by the FOV circle 630a. The gas monitoring system identifies the gas emission 620, but determines that the highest concentration point is outside a threshold percentage from the center of the FOV circle 630a. The gas monitoring system automatically adjusts the imager in the direction of the highest concentration point (i.e., closer to the release point 610) and takes a second image where the area captured is represented by the FOV circle 630b. The gas monitoring system again determines that the highest concentration point is outside a threshold percentage from the center of the FOV circle 630b, and it proceeds to readjust the camera to capture a third image corresponding to the FOV circle 630c. The gas monitoring system continues this process adjusting the camera to take a fourth and fifth image corresponding to the FOV circles 630d and 630e respectively. Finally, the gas monitoring system determines that the highest concentration of gas emission is within the a threshold percentage from the center the fifth image (represented by FOV circle 630e) and marks the image as including the release point 610 for the emission 620. The fifth image can then be processed to determine the emission rate.

Figure 7:
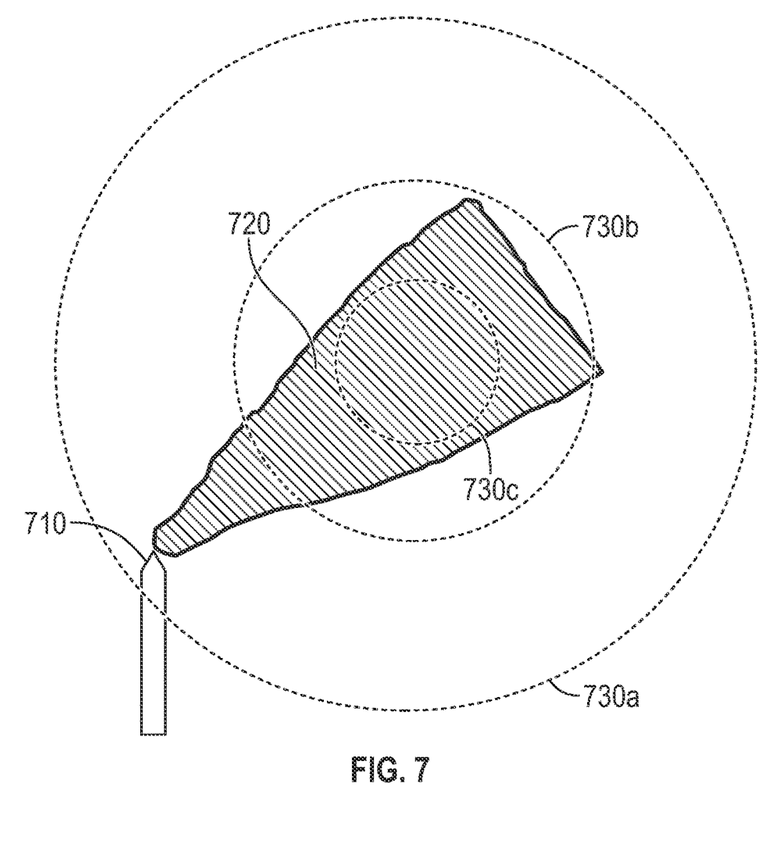
FIG. 7 is a diagram that illustrates a method for dynamically adjusting a camera's zoom to identify a gas emission source.

FIG. 7 is a diagram that illustrates a method for dynamically adjusting a camera's zoom to identify a gas emission source. For example, the zoom can be adjusted based on whether the gas plume covers more or less than percentage thresholds of an image. For example, if the plume covers more area of the image than an upper threshold (e.g., >75%), then the gas monitoring system can adjust the camera so that the next frame is at the same location but with a lower zoom. On the other hand, if the plume covers less area than a lower threshold (e.g., <25%), then the zoom can be increased. The diagram in FIG. 7 includes an emission release point 710 and a gas emission 720. Each of FOV circles 730a-c represent the FOV of a different image. In an example, the gas monitoring system first captures a first image where the area captured is represented by the FOV circle 730a. The gas monitoring system delineates the gas plume 720 and determines that the gas plume 720 covers more than a maximum threshold percentage of the FOV 730a. The gas monitoring system zooms the camera in and takes a second image where the FOV is represented by FOV circle 730b. The gas monitoring system determines that the gas plume coverage is within the upper and lower thresholds and therefore acceptable. Similarly, after taking an image with a FOV represented by the FOV circle 730c, the gas monitoring system can determine that the gas plume 720 covers less than a minimum threshold of the image and increase the zoom to the FOV circle 730b.

In an example, the zoom (FIG. 7) and bearing (FIG. 6) of the camera can be adjusted simultaneously. For example, when the gas monitoring system first detects a gas plume, it can adjust the camera's bearing to be more direct more toward the higher concentration of gas emission and also adjust the zoom based on the percentage of the image covered by the gas plume. The gas monitoring system can make both adjustments simultaneously between images or make one adjustment per image.

In some examples, the gas monitoring system can actively scan a detected gas emission, continuously or periodically capturing images of the emission. The frequency with which the frame with the emission source is scanned can be fixed (e.g., once every 5 frames) or it can be optimized based on emission rate, cycle length, and the number of active emissions in an area. Frequently scanning an active leak can have numerous benefits. For example, emission rate estimations usually require gas concentration and wind velocity data. As wind speed and direction vary, the plume shape and the computed emission rate may also vary. By scanning the plume frequently, data from varying conditions (e.g., varying wind conditions) can be collected and processed. The data from the varying conditions can be averaged to obtain a more complete and accurate emission rate. The data can be averaged using any appropriate method, such as algebraic, weighted, or through a Bayesian procedure, to compute an emission rate as accurately as possible. Also, more frequent scans increase the resolution of emission duration. More accurate duration information improves the estimation of emitted gas quantity for tracking and reporting purposes. Frequent scans also reduce false positives from noise. Random noise can look like an emission in a standalone picture. For a real emission, the emission source remains unchanged while the shape and location of noise are dynamic. By frequently scanning, noise can be more easily distinguished from a true emission.

Figure 8:
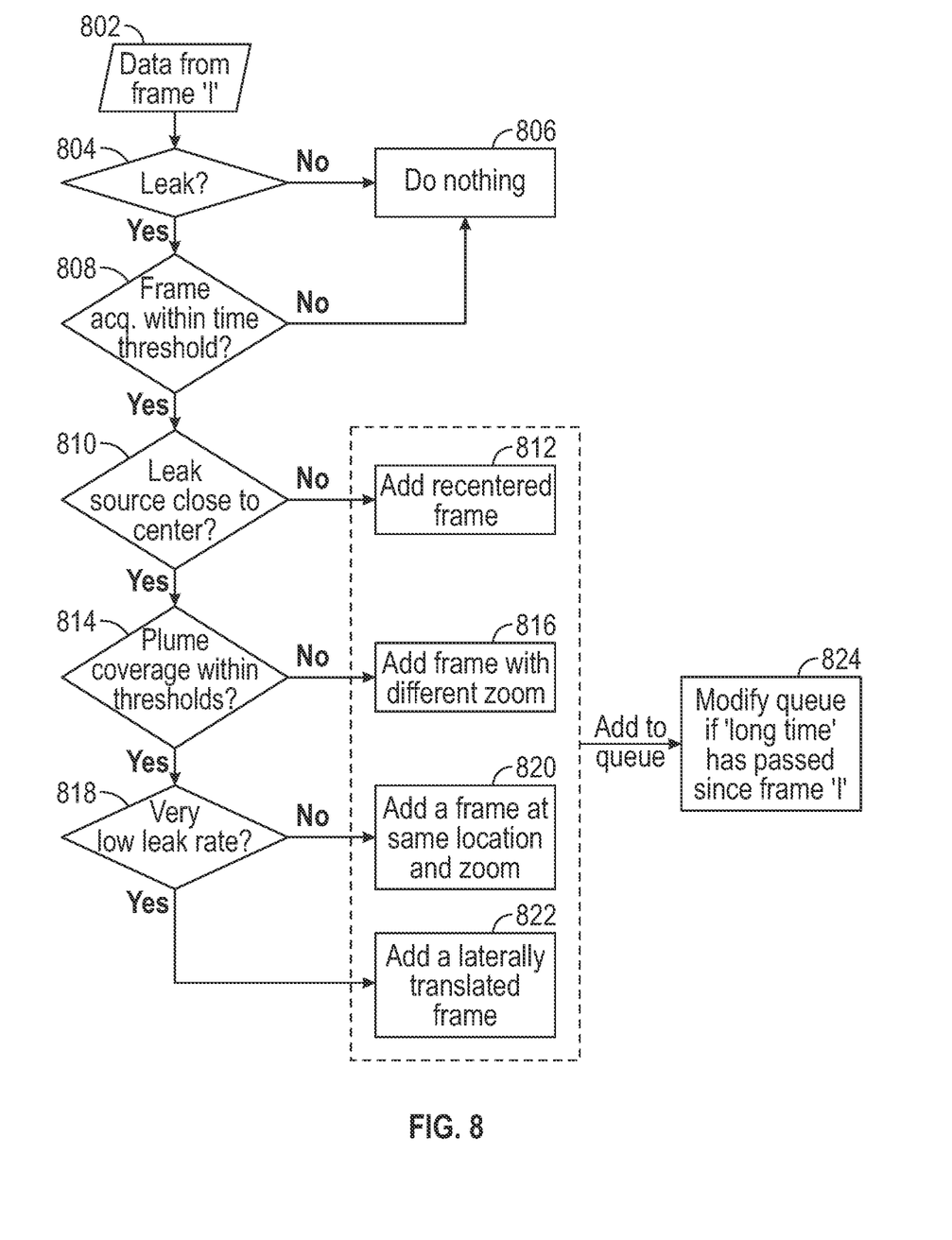
FIG. 8 is an illustration of an example method for dynamically scanning an area with gas emissions.

FIG. 8 is an illustration of an example method for dynamically scanning an area with gas emissions. At stage 802, the gas monitoring system can receive a first image from a gas imaging camera. At stage 804, the gas monitoring system can determine whether the first image includes a gas emission or leak. For example, the gas monitoring system can analyze the image for above-background levels of a gas present in the atmosphere in the line of view of the camera. The gas monitoring system can do this by comparing various data points. For example, the gas monitoring system can compare the measured density in the image to expected readings that are based on measured background methane levels. The gas monitoring system can also account for expected noise levels and any offsets or other biases present in the measurement system.

If no gas is detected, then at stage 806 the gas monitoring system does nothing with the first image. If gas is detected, then, at stage 808, the gas monitoring system can determine whether the first image satisfies a time threshold requirement. The time threshold requirement represents a cut-off time after which an image is considered too old to be reliable. This can be done to avoid making decisions on old images in case the system was shut-down and to handle time-lags and bottlenecks.

If the first image does not satisfy the time threshold requirement, then the method proceeds to stage 806 where the gas monitoring system does nothing with the first image. However, if the first image does satisfy the time threshold requirement, then the gas monitoring system can begin automatically making adjustments to the camera capturing additional images until a final image is obtained that satisfies predetermined parameters. In other words, the gas monitoring system captures additional images until it captures an image with the determined plume source near the center of the image.

For example, at stage 810, the gas monitoring system can determine whether the leak source is near the center of the image. In an example, the gas monitoring system can do this by identifying a point in the image with the highest concentration of gas emission and determine whether the point is within a threshold percentage of the first image's center. If not, then, at stage 812, the gas monitoring system can adjust the camera so that the previous highest concentration point is at the center of the camera's FOV. The gas monitoring system can take a second image and repeat stage 808. The gas monitoring system can continue to adjust the camera and take additional images until an image is taken with the highest concentration point within the threshold percentage of the image's center.

After such an image is obtained, at stage 814, the gas monitoring system can determine whether the coverage of the gas plume in the image falls within minimum and maximum coverage thresholds. If not, (e.g., the percentage of the image that includes the emission is below a minimum threshold or above a maximum threshold), then, at stage 816, the gas monitoring system can adjust the camera's zoom and take another image. For example, if the emission coverage is below a minimum threshold, then the gas monitoring system can increase the camera's zoom. If the emission coverage is above a maximum threshold, then the gas monitoring system can increase the camera's zoom.

In some examples, the gas monitoring system can perform stage 810 after each zoom adjustment and recenter the camera as needed. For example, zooming in or out can cause the highest gas concentration point to fall outside the threshold, thereby requiring recentering of the camera. In one example, the gas monitoring system can make the camera adjustments from stages 810 and 814 simultaneously.

Once the gas monitoring system captures an image where the plume coverage and emission source location satisfy their corresponding thresholds, the method can proceed to stage 818 where the gas monitoring system analyzes the emission size. If the emission size is not below a minimum threshold, then, optionally at stage 820, the gas monitoring system can zoom in and add an image at the same location. This final image can then be added to a queue at stage 824 for processing, which can include calculating the emission rate.

If the emission size is below a minimum size threshold, at stage 822 the gas monitoring system can take additional steps. As the emission rates get closer to the noise floors of the sensing system's hardware, it can become increasingly difficult to distinguish true and false positives. For such detections, in addition to recentering, the gas monitoring system can automatically capture additional images that translate the emission source laterally and vertically by a specified pan and tilt angle. The emission locations identified in the three images (centered, vertically translated, and laterally translated) can then be compared and the emission can be considered a true positive if the locations coincide within a margin of error. In another example, for low magnitude leaks the gas monitoring system can capture images with a longer acquisition duration. By increasing the acquisition time of an image capture and then averaging the data over this extended duration, noise averages out and the Signal-to-Noise ratio improves, reducing the potential for false positives.

In an example, if an emission location is identified with no physical sources nearby or with multiple sources within close vicinity, the gas monitoring system can add one or more additional images upwind, even if it is no longer centered, to help identify the emission source. If there are multiple emission sources in an area and the source of a particular plume is still unclear, the gas monitoring system can assign the plume to all sources within a predetermined distance with varying confidence scores. In one example, confidence scores can be based on how far upwind a source is from the detected plume. For example, higher confidence scores can be given to sources further upwind from the plume.

The gas monitoring system can leverage wind information to optimize frame selection. For example, instead of simply centering on the highest concentration point, the frame can be acquired such that the highest concentration point is upwind of the image center. This can ensure that a larger portion of the plume is in the image.

In addition to modifying frame control parameters, the gas monitoring system can also modify hardware parameters to improve measurement quality. For example, background surfaces with high reflection properties (e.g., ice, waterbodies, glass, polished surfaces, reflective paints, etc.) and precipitation (e.g., heavy rain, snow, sleet, fog, etc.) can cause albedo, which can change the intensity of returning photons. If the photon intensity exceeds a predetermined threshold, the gas monitoring system can automatically tune hardware parameters as required. For example, the gas monitoring system can reduce laser intensity, modify the pattern of laser motion to fill in the field of view, recalibrate the detector, and so on. These adjustments can be frame specific or time specific. For example, frame specific adjustments can be made for albedo localized in space and time specific adjustments can be made for albedo which can be a function of time of day.

In some examples, multiple gas monitoring systems can be used simultaneously at a single location. In such instances, data from multiple imagers can be incorporated to optimize image choices. For example, if one of the imagers detects a partial plume originating behind a structure from its point of view ("POV"), the system can determine if a different imager offers a better point of view. If so, the system can use the different imager to capture the final image of the emission. If a plume is within the line of sight of multiple imagers, albeit from different POVs, the system can consolidate data from all imagers. By combining plume data from multiple POVs, the system can triangulate emission location in a 3-Dimensional ("3D") space and delineate the extents of the plume with improved accuracy, thereby improving quantification. As wind direction changes, the scanning system can also determine which imager provides the most perpendicular view of a leak source and capture images of the emission with that camera. The system can also automatically remove upcoming image captures from an imager's pattern if an emission source is directly up or down wind from a specific imager.

When multiple systems are deployed at a single facility, the systems can be connected to a central platform that can assimilate data from all gas monitoring systems in real time. If one system detects an emission, the platform can notify a second system, which in turn adds images with the best viewpoint of that location. If the emission is confirmed and the emission source is not covered by the images of the deployed imagers, then the gas monitoring system can add it as a potential location in the background cycle. Whenever am emission is detected, the gas monitoring system can also query the central platform to check the earliest time at which one of the other systems detected the leak. This can improve leak duration quantification, providing a better estimate of total gas emitted.

The adaptive systems and methods described herein can be completely automated using queuing algorithms or can be semi-automated. The number of repeated images can be optimized depending on total queue time. The longer the queue time, the higher the risk of missing an intermittent emission. However, careful selection of cutoff thresholds and margins can avoid looping.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for determining an emission rate of a fugitive gas, comprising:
   receiving, from an imaging device, a first gas density image;
   detecting the fugitive gas in the first gas density image;
   delineating the fugitive gas in the first gas density image;
   sending, to the imaging device, instructions for adjusting a bearing of the imaging device bearing to optimize a position of the fugitive gas in the imaging device's field of view;
   sending, to the imaging device, instructions for capturing a second gas density image;
   receiving the second gas density image from the imaging device;
   calculating, based on the second gas density image, the emission rate of the fugitive gas;
   prior to sending the instructions for capturing the second gas density image, determining that a percentage of the fugitive gas is present in less than a threshold percentage of a vertical field of view of the first gas density image; and
   in response to the percentage of the fugitive gas being below the threshold percentage, sending, to the imaging device, instructions for modifying a zoom of the imaging device so that the fugitive gas is present in more than the threshold percentage of a vertical field of view of the imaging device.

2. The method of claim 1, further comprising:
   prior to sending the instruction for capturing the second gas density image, determining that the second gas density image includes a first portion of the fugitive gas that does not include all of the fugitive gas;
   sending instructions to the imaging device for capturing a third gas density image that includes a second portion of the fugitive gas that is horizontally adjacent the first portion of the fugitive gas;
   receiving, from the imaging device, the third gas density image; and
   stitching the first gas density image and the second gas density image together.

3. The method of claim 1, wherein calculating the emission rate of the gas density image comprises:
   determining a volume of the fugitive gas based on the second density image and a measured distance between the imaging device and the fugitive gas;
   receiving wind measurement data, the wind measurement data including measured wind speed and direction of wind in the vicinity of the fugitive gas;
   inputting the wind measurement data and the volume of the fugitive gas into a closed surface integral equation for calculating flux; and
   receiving an output from the closed surface integral equation, the output being a calculated amount of the fugitive gas.

4. The method of claim 1, wherein calculating the emission rate of the gas density image comprises:
   creating a cross-section in the fugitive gas in the second gas density image;
   dividing the cross-section into a plurality of subsections based on spacing between image pixels in the second gas density image, each of the plurality of subsections having an estimated length;
   determining a concentration of pixels for each of the plurality of subsections;
   determining a fugitive gas plume travel velocity orthogonal to the cross-section;
   inputting the determined concentration of pixels for each of the plurality of subsections, the fugitive gas plume travel velocity, and a weighting function into an equation; and
   receiving, as an output from the equation, a flux rate of the fugitive gas for the cross-section.

5. The method of claim 4, wherein calculating the emission rate of the gas density image further comprises:
calculating the flux rate for additional cross-sections of the fugitive gas;
determining that total flux of the fugitive gas by calculating an average of the calculated flux rate for the cross-section and the additional cross-sections of the fugitive gas.

6. The method of claim 4, wherein the estimated length of the plurality of subsections is determined by converting pixels to length using degrees of the imaging device's bearing and a measured length between the imaging device and the fugitive gas.

7. A non-transitory, computer-readable medium containing instructions that, when executed by a hardware-based processor, causes the processor to perform stages for determining an emission rate of a fugitive gas, the stages comprising:
receiving, from an imaging device, a first gas density image;
detecting the fugitive gas in the first gas density image;
delineating the fugitive gas in the first gas density image;
sending, to the imaging device, instructions for adjusting a bearing of the imaging device bearing to optimize a position of the fugitive gas in the imaging device's field of view;
sending, to the imaging device, instructions for capturing a second gas density image;
receiving the second gas density image from the imaging device;
calculating, based on the second gas density image, the emission rate of the fugitive gas;
prior to sending the instructions for capturing the second gas density image, determining that a percentage of the fugitive gas is present in less than a threshold percentage of a vertical field of view of the first gas density image; and
in response to the percentage of the fugitive gas being below the threshold percentage, sending, to the imaging device, instructions for modifying a zoom of the imaging device so that the fugitive gas is present in more than the threshold percentage of a vertical field of view of the imaging device.

8. The non-transitory, computer-readable medium of claim 7, the stages further comprising:
prior to sending the instruction for capturing the second gas density image, determining that the second gas density image includes a first portion of the fugitive gas that does not include all of the fugitive gas;
sending instructions to the imaging device for capturing a third gas density image that includes a second portion of the fugitive gas that is horizontally adjacent the first portion of the fugitive gas;
receiving, from the imaging device, the third gas density image; and
stitching the first gas density image and the second gas density image together.

9. The non-transitory, computer-readable medium of claim 7, wherein calculating the emission rate of the gas density image comprises:
determining a volume of the fugitive gas based on the second density image and a measured distance between the imaging device and the fugitive gas;
receiving wind measurement data, the wind measurement data including measured wind speed and direction of wind in the vicinity of the fugitive gas;
inputting the wind measurement data and the volume of the fugitive gas into a closed surface integral equation for calculating flux; and
receiving an output from the closed surface integral equation, the output being a calculated amount of the fugitive gas.

10. The non-transitory, computer-readable medium of claim 7, wherein calculating the emission rate of the gas density image comprises:
creating a cross-section in the fugitive gas in the second gas density image;
dividing the cross-section into a plurality of subsections based on spacing between image pixels in the second gas density image, each of the plurality of subsections having an estimated length;
determining a concentration of pixels for each of the plurality of subsections;
determining a fugitive gas plume travel velocity orthogonal to the cross-section;
inputting the determined concentration of pixels for each of the plurality of subsections, the fugitive gas plume travel velocity, and a weighting function into an equation; and
receiving, as an output from the equation, a flux rate of the fugitive gas for the cross-section.

11. The non-transitory, computer-readable medium of claim 10, wherein calculating the emission rate of the gas density image further comprises:
calculating the flux rate for additional cross-sections of the fugitive gas;
determining that total flux of the fugitive gas by calculating an average of the calculated flux rate for the cross-section and the additional cross-sections of the fugitive gas.

12. The non-transitory, computer-readable medium of claim 10, wherein the estimated length of the plurality of subsections is determined by converting pixels to length using degrees of the imaging device's bearing and a measured length between the imaging device and the fugitive gas.

13. A system for determining an emission rate of a fugitive gas, comprising:
an imaging device;
a memory storage including a non-transitory, computer-readable medium comprising instructions; and
a hardware-based processor that executes the instructions to carry out stages comprising:
receiving, from the imaging device, a first gas density image;
detecting the fugitive gas in the first gas density image;
delineating the fugitive gas in the first gas density image;
sending, to the imaging device, instructions for adjusting a bearing of the imaging device bearing to optimize a position of the fugitive gas in the imaging device's field of view;
sending, to the imaging device, instructions for capturing a second gas density image;
receiving the second gas density image from the imaging device;
calculating, based on the second gas density image, the emission rate of the fugitive gas;
prior to sending the instructions for capturing the second gas density image, determining that a percentage of the fugitive gas is present in less than a threshold percentage of a vertical field of view of the first gas density image; and in response to the percentage of the fugitive gas being below the threshold percentage, sending, to the imaging device, instructions for modifying a zoom of the imaging device so that the fugitive gas is present in more than the threshold percentage of a vertical field of view of the imaging device.

14. The system of claim 13, the stages further comprising:
prior to sending the instruction for capturing the second gas density image, determining that the second gas density image includes a first portion of the fugitive gas that does not include all of the fugitive gas;
sending instructions to the imaging device for capturing a third gas density image that includes a second portion of the fugitive gas that is horizontally adjacent the first portion of the fugitive gas;
receiving, from the imaging device, the third gas density image; and
stitching the first gas density image and the second gas density image together.

15. The system of claim 13, wherein calculating the emission rate of the gas density image comprises:
determining a volume of the fugitive gas based on the second density image and a measured distance between the imaging device and the fugitive gas;
receiving wind measurement data, the wind measurement data including measured wind speed and direction of wind in the vicinity of the fugitive gas;
inputting the wind measurement data and the volume of the fugitive gas into a closed surface integral equation for calculating flux; and
receiving an output from the closed surface integral equation, the output being a calculated amount of the fugitive gas.

16. The system of claim 13, wherein calculating the emission rate of the gas density image comprises:
creating a cross-section in the fugitive gas in the second gas density image;
dividing the cross-section into a plurality of subsections based on spacing between image pixels in the second gas density image, each of the plurality of subsections having an estimated length;
determining a concentration of pixels for each of the plurality of subsections;
determining a fugitive gas plume travel velocity orthogonal to the cross-section;
inputting the determined concentration of pixels for each of the plurality of subsections, the fugitive gas plume travel velocity, and a weighting function into an equation; and
receiving, as an output from the equation, a flux rate of the fugitive gas for the cross-section.

17. The system of claim 16, wherein calculating the emission rate of the gas density image further comprises:
calculating the flux rate for additional cross-sections of the fugitive gas; and
determining that total flux of the fugitive gas by calculating an average of the calculated flux rate for the cross-section and the additional cross-sections of the fugitive gas.

* * * * *